United States Patent Office 3,018,225
Patented Jan. 23, 1962

3,018,225
PRODUCTION OF VITAMIN $B_{12}$
Robert A. Long, Parlin, N.J., assignor to Merck & Co., Inc., Rahway, N.J., a corporation of New Jersey
No Drawing. Filed Mar. 9, 1959, Ser. No. 797,832
10 Claims. (Cl. 195—114)

This invention relates to substances having vitamin $B_{12}$ activity and, more particularly, to the production of such vitamin $B_{12}$-active substances by fermentation.

This application is a continuation-in-part of copending application, Serial No. 607,583, filed September 4, 1956, now abandoned, which in turn is a continuation-in-part of copending application, Serial No. 341,621, filed March 10, 1953, now abandoned.

An object of this invention is to provide a method for the production of vitamin $B_{12}$-active substances by fermentation and to the substantial exclusion of antibiotics.

Another object of the invention is to effect the production of vitamin $B_{12}$-active substances efficiently and economically by the utilization of a shorter fermentation cycle than that previously employed.

It has been disclosed in U.S. Patent No. 2,703,302 that vitamin $B_{12}$-active substances may be produced by fermentation utilizing selected vitamin $B_{12}$-producing strains of microorganisms of the genus Alcaligenes, the genus Bacillus, the genus Escherichia, the genus Mycobacterium, the genus Pseudomonas and the genus Streptomyces.

However, the large-scale production of vitamin $B_{12}$-active substances by fermentation prior to my copending application has generally been accomplished by utilizing certain species of the genus Streptomyces. This was for the reason that the streptomyces have been generally regarded as the best producers of vitamin $B_{12}$-active substances. These prior fermentation methods for producing vitamin $B_{12}$-active substances utilizing Streptomyces microorganisms have, however, been relatively inefficient and uneconomical due to the fact that the rate of fermentation utilizing the Streptomyces organisms has been relatively slow. The disadvantages resulting from this slow fermentation rate have been intensified by the circumstances that, in the production of vitamin $B_{12}$-active substances employing the Streptomyces, antibiotics such as streptomycin, grisein, and the like, occur in the fermented broth and that these antibiotics must be separated by involved and time-consuming procedures from the vitamin $B_{12}$-active materials.

In accordance with my invention I have found that vitamin $B_{12}$-activity producing strains of a specific species of microorganisms of the genus Pseudomonas, namely *Pseudomonas denitrificans*, produce vitamin $B_{12}$-active substances by fermentation not only in high yield but at a rapid rate and without the significant production of undesirables such as antibiotics. These vitamin $B_{12}$-activity producing strains of *Pseudomonas denitrificans* can be further characterized as being cyanide resistant since they are capable of producing vitamin $B_{12}$-active substances in nutrient media containing up to about 250 micrograms cyanide ion per milliliter.

The vitamin $B_{12}$-active substances are produced by fermenting a nutrient medium with a vitamin $B_{12}$-activity producing strain of the species *Pseudomonas denitrificans*, whereby the vitamin $B_{12}$-active substances, unmixed with antibiotics and similar unwanted materials, are produced in high yield at a fermentation rate over twice that ordinarily achieved utilizing prior fermentation methods. The specific fermentation process of my invention considerably reduces the cost of producing the vitamin $B_{12}$-active substances, and so makes it possible to make these important substances available at a substantially lower price than heretofore. This is of particular significance where the quantities of these substances needed for the treatment of certain conditions, such as nervous disorders, and for the feeding of certain animals to promote growth, such as chickens, turkeys and pigs, are appreciably greater than the quantities needed for the treatment of pernicious anemia.

The high yield, short fermentation time characteristic of the specific fermentation process of my invention makes commercially practical the production of vitamin $B_{12}$-active substances by the continuous fermentation technique. In this technique, after the fermentor has run a sufficient length of time to build up in the fermentator the maximum, or near-maximum, level of desired fermentation product, fresh nutrient is continuously added to the fermentor and fermented broth is continuously withdrawn from the fermentor at identical rates so that the volume within the fermentor is maintained constant. This flow rate is preferably such that steady state fermentation conditions are maintained in the fermentor. When the batch fermentation time is relatively short, the buildup time for continuous fermentation is short, and the flow rate can be high. Hence the length of time to withdraw a full fermentator volume of fermented broth is relatively short. This time is referred to as the turnover time. Thus, within a given period of time during which the fermentor is operated in accordance with the continuous fermentation technique, the total volume withdrawn from the fermentor is considerably greater when the batch fermentation time is relatively short, as compared with a situation where the batch fermentation time is relatively long.

But efficient utilization of the continuous fermentation technique requires not only that the batch fermentation time be relatively short, but also that the level of desired fermentation product in the volumes withdrawn from the fermentor be relatively high. My specific invention for producing vitamin $B_{12}$-active substances achieves both objectives, where heretofore one or the other, but not both, had been achieved.

More specifically, the fermentation procedure of my invention is ordinarily conducted by inoculating an aqueous nutrient medium containing a source of assimilable carbon and a source of assimilable nitrogen with a vitamin $B_{12}$-producing strain of *Pseudomonas denitrificans* and conducting the fermentation under submerged aerated conditions. In accordance with this fermentation procedure, fermentation broths having vitamin $B_{12}$ activity of more than 3000 micrograms per liter are ordinarily obtained after a 48-hour fermentation period which corresponds to a production rate of approximately 60 micrograms of vitamin $B_{12}$-active substances per liter per hour. This high production rate is an important economic factor in the production of vitamin $B_{12}$-active substances.

The *Pseudomonas denitrificans* microorganism employed in this novel process exhibits the characteristics of this organism described in Bergey's Manual of Determinative Bacteriololgy, sixth edition (Breede, Murray and Hitchens). The vitamin $B_{12}$ activity producing strains of this organism can be selected by fermenting a nutrient medium with said strain and then assaying the resulting broth for vitamin $B_{12}$-active substances by the following radioactive tracer technique. This method consists of a pretreatment of the broth sample with cyanide ions to convert the vitamin $B_{12}$-like substance to vitamin $B_{12}$. A tracer amount of radioactive vitamin $B_{12}$ measurable by a Geiger counter is added and the vitamin $B_{12}$ extracted from the broth and the extract purified. The concentration of the purified vitamin $B_{12}$ extract is then determined by means of its visible absorption spectrum and the amount of radioactive vitamin $B_{12}$ in the extract measured by a Geiger counter. From these data the amount of vitamin $B_{12}$ and vitamin $B_{12}$-like substances, convertible to vitamin $B_{12}$ under the conditions used, which were present in the original broth may be readily calculated.

The nutrient medium utilized in the practice of this invention contains a source of assimilable carbon, a source of assimilable nitrogen and various mineral salts to supply the tracer mineral requirements of the bacterium. The medium is sterilized by heating prior to inoculation.

As a source of assimilable carbon a sugar such as maltose, crude lactose, brown sugar (sucrose), beet molasses and the like, as well as rye, hydrol, ribose, dried whey, cottonseed meal, and the like, is ordinarily utilized. Beet molasses is the preferred source of assimilable carbon. The amount of assimilable carbon may vary from 2.5 to 10% by weight of the nutrient medium; it has been found that about 6–8% of assimilable carbon ordinarily results in optimum yields.

Either organic or inorganic nitrogen derivatives can be used as the source of assimilable nitrogen as, for example, nitrogen containing compounds and nitrogen complexes, such as proteins or degraded proteins, such as hydrolyzed proteins, amino acids, distiller's solubles, cornsteep liquor, yeast autolysate, soybean meal, urea and the like. The preferred sources of assimilable nitrogen are inorganic ammonium compounds, such as ammonium hydroxide, ammonium phosphate, ammonium sulfate and other ammonium salts. A concentration of a source of assimilable nitrogen of about 0.1% by weight of the nutrient medium ordinarily results in optimum yields, however a range of concentrations may be employed depending on the characteristics of the nitrogen-containing compounds.

Mineral nutrients are necessary in the medium to obtain the greatest production of vitamin $B_{12}$-active substances. It is therefore desirable to add salts containing the elements of potassium, sulphur and phosphorous. The following minerals are apparently required in tract amounts (from about 1 to about 100 p.p.m. of each): zinc, iron, manganese, magnesium and cobalt. When the culture medium is prepared from refined materials it appears to be essential to add these trace elements. However, when technical-grade materials are used in preparing the medium, such as beet molasses, these trace elements may already be present. It is preferred to add a non-toxic amount of cobalt in the range of about 1 to 50 p.p.m., preferably 1 to 10 p.p.m. If trace elements are to be added to the medium, one can use any suitable salt such as the chlorines, sulphates, nitrates, and the like.

As set forth hereinabove, the fermentation procedure utilizing Pseudomonas denitrificans is ordinarily carried out by means of submerged growth with agitation and aeration. The fermentation is conducted at a temperature within the range of 25° C. to 37° C.; for optimum yield and rate of production of vitamin $B_{12}$-active substance, it is preferred to utilize a temperature within the range of 27 to 33° C., the preferred temperature being about 30° C. Under these preferred fermentation conditions, it has been found that the maximum concentration of vitamin $B_{12}$-active substances is present after a fermentation period within the range of about 48 to 96 hours, and, in most instances, the maximum concentration is reached within the range of about 48 to 70 hours.

The fermentation may be carried out over a fairly broad range of hydrogen ion concentration. The pH of the starting medium is preferably adjusted to a range of 7.1 to 7.5 to achieve optimum results. As the fermentation proceeds, the pH value rises showing an increase up to a pH of about 8 after forty-eight hours. The operative pH range is from 6.6 to 9.

In accordance with this novel fermentation procedure there are obtained fermentation broths containing vitamin $B_{12}$-active substances substantially uncontaminated with undesired by-products such as antibiotics. The term vitamin $B_{12}$-active substances includes both vitamin $B_{12}$ and the vitamin $B_{12}$-like substances which are sometimes called vitamin $B_{12}$ analogs. These vitamin $B_{12}$-like substances are characterized by their ability to be readily convertible into vitamin $B_{12}$ by treatment with cyanide ion as disclosed in U.S. Patent No. 2,530,416.

Since the vitamin $B_{12}$-active materials produced in accordance with the present invention are free of undesired products, they are ideally adapted, without the need for involved purification treatments, for use as concentrates having antipernicious activity and as feed supplement. Thus, a Pseudomonas denitrificans fermentation broth or the corresponding concentrate can be used directly, without purification, for the enrichment of feeds deficient in the animal proteins, as, for example, feeds consisting of edible vegetable protein matter.

Where it is desired to recover a purified vitamin $B_{12}$-active concentrate or pure vitamin $B_{12}$ from the Pseudomonas denitrificans fermentation broth, this can be accomplished in accordance with the procedure described in Example 8.

The following examples illustrate a method of carrying out the present invention, but it is to be understood that these examples are given primarily by way of illustration and not of limitation.

EXAMPLE 1

A nutrient medium was prepared containing the following:

| | |
|---|---|
| Beet molasses | 125.0 gms. |
| Ammonium phosphate | 2.0 gms. |
| Sodium sulfate | 2.0 gms. |
| Potassium chloride | 0.8 gms. |
| Magnesium sulfate heptahydrate | 0.5 gms. |
| Anhydrous manganous sulfate | 0.02 gms. |
| Zinc sulfate heptahydrate | 0.02 gms. |
| Ferrous sulfate heptahydrate | 0.02 gms. |
| Cobaltous nitrate hexahydrate | 25 p.p.m. (5 p.p.m. as $Co^{++}$). |

Water to 1 liter.

Portions consisting of 40 ml of this medium were distributed into 250 ml. cotton-plugged Erlenmeyer flasks. After the sterilization of this medium, the contents of the flasks were inoculated with a distilled water suspension of a 48 hour nutrient agar culture of a vitamin $B_{12}$ and vitamin $B_{12}$-like producing strain of Pseudomonas denitrificans. The isolates of Pseudomonas denitrificans were obtained from soil samples taken from the areas indicated below. Aeration was effected by agitation of the flask contents on a rotary shaker operating at 2½ inches amplitude and 220 r.p.m. at 28° C. for 48 hours.

The resulting broths were assayed for vitamin $B_{12}$ activity by the E. coli method.

| P. denitrificans Isolate No. | Av. $B_{12}$ Content (E. Coli), μg/l. | Location |
|---|---|---|
| 1 | 2,200 | Ohio—Soy bean. |
| 2 | 3,600 | Dade County, Florida—Soil Pit. |
| 3 | 2,700 | Dade County, Florida—black sand. |
| 4 | 3,600 | Miami, Florida—Okra field. |
| 5 | 3,100 | Florida—Garden soil. |
| 6 | 2,200 | Morris County, New Jersey. |
| 7 | 2,600 | Chicken litter. |

The E. coli assay method is carried out as follows: A one ml. sample of autoclaved broth is diluted in a M/20 phosphate buffer pH 5 to various levels. Petri dishes containing 20 cc. of a medium deficient in vitamin $B_{12}$ are seeded with a vitamin $B_{12}$ dependent mutant strain of E. coli. Six metal cylinders are placed on the hardened agar surface. Three cylinders are filled with a 2,000 u./ml. vitamin $B_{12}$ solution. The other three cylinders are filled with samples of the diluted broth being studied. Dilutions of a 220,000 u./ml. standard solution are made and placed in cylinders. The plates are then incubated overnight at 37° C. The zones of stimulated growth of the diluted 220,000 u./ml. vitamin $B_{12}$ solution are measured and a standard curve is obtained. The diameters of stimulated growth of 2,000 u./ml. vitamin $B_{12}$ solution and the unknown broth are measured. These zones are then compared with the slope of the standard curve on a nomograph and the value of the unknown determined by multiplying by the dilution factor. One milligram of pure crystalline vitamin $B_{12}$ contains 11,000,000 LLD units.

EXAMPLE 2

A nutrient medium was prepared containing the following:

Beet molasses _____ 125.0 gms.
Ammonium phosphate _____ 2.0 gms.
Sodium sulfate _____ 2.0 gms.
Potassium chloride _____ 0.8 gms.
Magnesium sulfate heptahydrate __ 0.5 gms.
Anhydrous manganous sulfate ___ 0.02 gms.
Zinc sulfate heptahydrate _____ 0.02 gms.
Ferrous sulfate heptahydrate _____ 0.02 gms.
Cobaltous nitrate hexahydrate ___ 25 p.p.m.
(5 p.p.m. as $Co^{++}$).
Water to 1 liter.

Portions consisting of 40 ml. of this medium were distributed into 250 ml. cotton-plugged Erlenmeyer flasks. After the sterilization of this medium, the contents of the flasks were inoculated with a distilled water suspension of a 48 hour nutrient agar culture of a vitamin $B_{12}$ and vitamin $B_{12}$-like producing strain of *Pseudomonas denitrificans* (MB-580). Aeration was effected by agitation of the flask contents on a rotary shaker operating at 2½ inches amplitude and 220 r.p.m. at 28° C. for 48 hours. The following results were the averages of several fermentations sampled and assayed at 24 and 48 hours by the L.L.D. assay.

Table 1

| Time | Average Vitamin $B_{12}$ Content (LLD), micrograms/liter |
|---|---|
| 24 hours | 727 |
| 48 hours | 3,460 |

The L.L.D. assay method is similar to that of *E. coli* assay method employing the organism *Lactobacillus lactis* (Dorne).

EXAMPLE 3

Aliquots of 40 ml. of the nutrient medium described in Example 2 were distributed into twelve Erlemeyer flasks. After sterilization, the flask contents were aseptically inoculated with 1 ml. of a 24 hour vegetative growth of a vitamin $B_{12}$ and vitamin $B_{12}$-like producing strain of *Pseudomonas denitrificans* grown in the same medium. Aeration was effected by agitation of the flask contents on a rotary shaker operating at 2½ inches amplitude and 220 r.p.m. at 28° C. At the intervals of time indicated in the table, three flasks were removed. The averages of the three fermentations for each of the times specified are summarized in the following table:

Table 2

| Time, hrs. | pH | Cell Volume, Percent | Dry Cell Weight, mg./ml. | Average Vitamin $B_{12}$ Content (LLD), micrograms/liter |
|---|---|---|---|---|
| 24 | 7.5 | 7 | 6.06 | 1,100 |
| 48 | 7.6 | 10 | 7.70 | 2,730 |
| 72 | 7.2 | 12 | 7.73 | 2,180 |
| 90 | 6.5 | 11 | 7.00 | 1,810 |

EXAMPLE 4

Three hundred liters of the medium described in Example 2 was inoculated with 10 percent of a 36 hour vegetative growth of a vitamin $B_{12}$ and vitamin $B_{12}$-like producing strain of *Pseudomonas denitrificans* grown in the same medium. The fermentation was carried out in a 200 gallon fermenter with agitation and aeration. The temperature was maintained at about 30° C. Samples of the fermentation broth were removed after 24 and 48 hour periods.

The samples were assayed for vitamin $B_{12}$ content by the radioactive tracer technique which consists of a pretreatment of the broth sample with cyanide ions to convert the vitamin $B_{12}$-like substances to vitamin $B_{12}$. A tracer amount of radioactive vitamin $B_{12}$ measurable by a Geiger counter is added and the vitamin $B_{12}$ extracted from the broth and the extract purified. The concentration of the purified vitamin $B_{12}$ extract is then determined by means of its visible absorption spectrum and the amount of radio active vitamin $B_{12}$ in the extract measured by a Geiger counter. From these data the amount of vitamin $B_{12}$ and vitamin $B_{12}$-like substances, convertible to vitamin $B_{12}$ under the conditions used, which were present in the original broth may be readily calculated.

The following results were obtained employing the radioactive tracer technique:

Table 3

| Hours | Vitamin $B_{12}$, micrograms/liter |
|---|---|
| 24 | 1,450 |
| 48 | 1,820 |

EXAMPLE 5

Three hundred liters of the medium described in Example 2 were fermented with a vitamin $B_{12}$ and vitamin $B_{12}$-like producing strain of *Pseudomonas dentrificans*. The inoculum and conditions used herein were essentially the same as described in Example 4. The fermentation broth was harvested after a 48 hour incubation period and assayed for its vitamin $B_{12}$ content by the radioactive assay procedure.

Vitamin $B_{12}$ content: 2000 micrograms/liter.

EXAMPLE 6

An aqueous nutrient medium was prepared containing the following:

Beet molasses, percent _____ 4.0
Corn steep liquor, percent _____ 3.5
Ammonium phosphate, percent _____ 0.2
Cobaltous nitrate hexahydrate, p.p.m. _____ 40

Portions consisting of 40 ml. of this medium were distributed into 250 ml. cotton plugged Erlenmeyer flasks. After sterilizing this medium, the contents of the flasks were inoculated with a vegetative culture of a vitamin $B_{12}$ and vitamin $B_{12}$-like producing strain of *Pseudomonas denitrificans*. Aeration was effected by agitation of the flask contents on a rotary shaker operating at 2½ inches amplitude and 220 r.p.m. at 28° C. for 66 hours. The broths were assayed for vitamin $B_{12}$ and vitamin $B_{12}$-like substances by the *E. coli* assay method.

Average vitamin $B_{12}$ (*E. coli* assay): 2500 micrograms/liter.

EXAMPLE 7

A nutrient medium was prepared as described in Example 2 with the exception that 40 p.p.m. of cobaltous nitrate hexahydrate instead of 25 p.p.m. was added. Three thousand two hundred milliliters of the medium was placed in a 5 liter fermentation vessel, sterilized, inoculated with a vegetative culture of a vitamin $B_{12}$ and vitamin $B_{12}$-like producing strain of *Pseudomonas denitrificans* and allowed to ferment with agitation and aeration for about 45 hours. The temperature was maintained at about 30° C. throughout the fermentation period. The broth was assayed for vitamin $B_{12}$ content by the radioactive assay procedure.

Vitamin $B_{12}$ content: 2365 micrograms/liter. (*E. coli* assay: 3460 micrograms/liter.)

EXAMPLE 8

Seventeen and three-tenths liters of whole fermentation broth prepared as in Example 1 was autoclaved for one-half hour at 120° C. Three milliliters of radioactive vitamin $B_{12}$ tracer (containing 24,600 counts per minute) were added to the autoclaved broth and the broth was adjusted to pH 8.5 with 10 grams of potassium cyanide and potassium hydroxide. The both was stirred 16 hours at room temperature. One thousand grams of zinc chloride was added to the broth with agitation (pH 5.5) and the pH of the mixture adjusted to pH 8.0 with sodium hydroxide. One kilo of diatomaceous earth was added, the mixture was stirred for one-half hour and filtered. The filter cake was reslurried in water, filtered and the filtrates combined.

The combined filtrates (17.8 liters) were extracted three times with 1780 ml. each of a 1:2 cresol-carbon tetrachloride solution. The spent water layer was discarded.

The cresol-carbon tetrachloride extracts were combined (5120) ml.) treated with 2560 ml. of butanol and extracted three times with 510 ml. of water each time. The spent solvent layer was discarded.

The water extracts were combined and adjusted to pH 8.5 with 3 grams of potassium cyanide and sodium hydroxide and allowed to stand for one hour. The solution was then extracted three times with 150 ml. of 1:2 cresol carbon tetrachloride solution. The vitamin $B_{12}$ was precipitated from the solvent by the addition of 2 volumes of acetone and 1 volume of ether. The precipitate was dried under vacuo.

The vitamin $B_{12}$ was taken up in 50 ml. of methanol and chromatographed using 20 grams of activated alumina. The alumina was washed with methanol-2% acetic acid solution to remove all the vitamin $B_{12}$. The vitamin $B_{12}$ in the effluent was precipitated with 10 volumes of ether and the precipitate dried.

The precipitate was dissolved in methanol and rechromatographed using 10 grams of alumina. The methanol effluent was precipitated with ether. The precipitate was dissolved in 3 ml. of water and 37 ml. of acetone added. The vitamin $B_{12}$ crystals obtained weighed 18.5 mg. The purity of the crystals by U.V. and water-benzyl alcohol distribution was 81%. The moisture content was 7%. The radioactive tracer recovered was 13,500 counts per minute (a 55% recovery of tracer).

The vitamin $B_{12}$ in the whole broth is calculated from the vitamin $B_{12}$ recovered and the tracer yield:

$$\frac{(18.5 \text{ mg. vitamin } B_{12}) (81\% \text{ pure})}{55\% \text{ tracer yield}}$$

$= 27.2$ mg. of vitamin $B_{12}$ in 17.3 liters broth

Whole broth contains:

$$\frac{(27.2 \text{ mg. vitamin } B_{12}) (11,000,000 \text{ units per mg. vitamin } B_{12})}{17,300 \text{ ml. broth}}$$

$=17,300$ units/ml.

The bioassay of the whole broth was as follows: *E. coli*—34,100 units per ml.

EXAMPLE 9

A nutrient medium was prepared containing the following:

Sucrose _____ 60.0 gms.
Yeast autolysate _____ 50.0 gms.
Ammonium phosphate _____ 2.0 gms.
Sodium sulfate _____ 2.0 gms.
Potassium chloride _____ 0.8 gms.
Magnesium sulfate heptahydrate _____ 0.5 gms.
Anhydrous manganous sulfate _____ 0.02 gms.
Zinc sulfate heptahydrate _____ 0.02 gms.
Ferrous sulfate heptahydrate _____ 0.02 gms.
Cobaltous nitrate hexahydrate _____ 25 p.p.m.
Water to 1 liter.       (5 p.p.m. as $Co^{++}$)

Portions consisting of 40 ml. of this medium were distributed into 250 ml. cotton plugged Erlenmeyer flasks. After sterilizing this medium, the contents of the flasks were inoculated with a vegetative culture of a vitamin $B_{12}$ and vitamin $B_{12}$-like producing strain of *Pseudomonas denitrificans*. Aeration was effected by agitation of the flask contents on a rotary shaker operating at 2½ inches amplitude and 200 r.p.m. at 28° C. for 66 hours. The broths were assayed for vitamin $B_{12}$ and vitamin $B_{12}$-like substances by the *E. coli* assay method.

Average vitamin $B_{12}$ (*E coli* assay): 3000 micrograms/liter.

EXAMPLE 10

Three-hundred liters of a whole fermentation broth (including the cellular material) prepared as in Example No. 4 was drum dried to give a solid product containing about 6 milligrams of vitamin $B_{12}$ per pound. This solid vitamin $B_{12}$ concentrate may be used to enrich animal feeds deficient in the animal protein factor.

EXAMPLE 11

This illustrate the invention as applied to the continuous fermentation technique.

A 200 gallon stainless steel fermentor was charged with the following nutrients:

|   | Grams |
|---|---|
| Beet molasses | 25,200 |
| $(NH_4)_2HPO_4$ | 840 |
| $NH_4NO_3$ | 2,100 |
| $Na_2SO_4$ | 840 |
| KCl | 336 |
| $MgSO_4.7H_2O$ | 210 |
| $MnSO_4.H_2O$ | 63 |
| $ZnSO_4.7H_2O$ | 8.4 |
| $FeSO_4.7H_2O$ | 8.4 |
| $Co(NO_3)_2.6H_2O$ | 16.8 |

Water to make 378 liters.

The pH was adjusted to 7.5 and the fermentor and its contents sterilized at 125° C. for ¾ hour. After cooling, the fermentor was inoculated with 42 liters of a vitamin $B_{12}$-activity producing strain of *Pseudomonas denitrificans*, which had been previously prepared in an inoculum tank in a nutrient medium of the same composition as above. The temperature of the fermentor contents was maintained at 29° C., an airflow of 10 cubic feet per hour was passed through the contents of the fermentor, and the fermentor contents were agitated with a Mixco impeller of standard design operating at 135 revolutions per minute. Soy bean oil was added as needed as a defoamer. The pH of the fermentor contents was adjusted as needed by adding sodium hydroxide so that the pH was maintained within the range of 6.8 to 7.2.

The fermentation was allowed to proceed as above for 24 hours, so as to develop a suitable inoculum for operation under continuous fermentation conditions.

At the end of the 24 hour period mentioned, sterile nutrient medium of the same composition as previously described was pumped continuously into the fermentor at the rate of 466.6 cc. per minute, or 28 liters per hour. At the same time fermented broth was removed continuously from the fermentor at the same rate, so that the fermentor contents were maintained at a constant volume. The fermentation broth was collected, measured as to volume and assayed by radioactive procedures for vitamin $B_{12}$-active substances. At this rate of flow, one volume of the fermentor contents (i.e., 420 liters), was withdrawn every 15 hours. Thus the so-called "turnover" time was 15 hours.

This continuous fermentation was continued until 7 complete "turnovers" has been accomplished, i.e., for 105 hours. The average of the assay of the broth from the continuous fermentation showed it had 2.3 micrograms of vitamin $B_{12}$ activity per milliliter of broth.

To compare this continuous fermentation operation with batch operation, a fermentor similar to the one described was charged with identical nutrients and inoculum and the contents fermented under the same conditions for a period of 30 hours, by which time the maxium vitamin $B_{12}$ activity was produced in the broth, amounting to 2.4 micrograms per milliliter. Hence, when the broth is harvested from the fermentor at this time, the fermentor must be cleaned, recharged and resterilized before fermentation of another batch is started in the same fermentor. This "down time" is estimated as 6 hours. The complete production cycle in batch operation is thus 30 hours fermentation time and 6 hours down time, totaling 36 hours.

Consequently, when operating under continuous fermentation conditions, in 105 hours the equivalent of 7 batches was harvested, while when operating under batch fermentation conditions, in substantially the same time (108 hours) only 3 batches are harvested.

The comparison is continued in the following table:

| Process | Fermentation Time | Vitamin $B_{12}$ activity per ml., micrograms | Total Volume Harvested, liters | Total Vitamin $B_{12}$ Activity Produced, micrograms |
|---|---|---|---|---|
| Continuous | 105 hrs (7 turnovers). | 2.3 | 2,940 | 6,780 |
| Batch | 108 hrs. (3 batches). | 2.4 | 1,260 | 3,020 |

From this table it is evident that when my specific process is applied to the continuous fermentation procedure, the total amount of vitamin $B_{12}$-active substances produced is over twice that produced by my process as applied to the standard batch procedure.

Modifications may be made in carrying out the present invention without departing from the spirit and scope thereof and the invention is to be limited only by the appended claims.

What is claimed is:

1. The process of producing vitamin $B_{12}$-active substances that comprises fermenting a nutrient medium containing a source of cobalt ion with a vitamin $B_{12}$ activity producing strain of *Pseudomonas denitrificans* and recovering vitamin $B_{12}$-active substances therefrom.

2. The process of producing vitamin $B_{12}$-active substances that comprises fermenting a nutrient medium containing a source of cobalt ion with a vitamin $B_{12}$ activity producing cyanide-resistant strain of *Pseudomonas denitrificans* and recovering vitamin $B_{12}$-active substances therefrom.

3. The process of producing vitamin $B_{12}$ that comprises fermenting a nutrient medium containing a source of cobalt ion with a vitamin $B_{12}$-producing strain of *Pseudomonas denitrificans* and recovering vitamin $B_{12}$-active substances therefrom.

4. The process of producing vitamin $B_{12}$ that comprises fermenting a nutrient medium containing a source of cobalt ion with a vitamin $B_{12}$-producing cyanide-resistant strain of *Pseudomonas denitrificans* and recovering vitamin $B_{12}$-active substances therefrom.

5. The process of producing vitamin $B_{12}$-active substances that comprises inoculating an aqueous nutrient medium containing a source of cobalt ion with a vitamin $B_{12}$ activity producing strain of *Pseudomonas denitrificans*, conducting fermentation of the inoculated medium under submerged aerated conditions and recovering vitamin $B_{12}$-active substances therefrom.

6. The process of producing vitamin $B_{12}$ active substances that comprises fermenting an aqueous nutrient medium containing a source of cobalt ion under submerged aerated conditions for about 48 hours at a temperature of about 28° C. with a vitamin $B_{12}$ activity producing strain of *Pseudomonas denitrificans* and recovering vitamin $B_{12}$-active substances therefrom.

7. The process of producing vitamin $B_{12}$-active substances that comprises fermenting an aqueous nutrient medium comprising a source of assimilable carbon, a source of assimilable nitrogen and a source of cobalt ion with a vitamin $B_{12}$ activity producing strain of *Pseudomonas denitrificans* and recovering vitamin $B_{12}$-active substances therefrom.

8. The process of producing vitamin $B_{12}$-active substances that comprises fermenting an aqueous nutrient medium comprising beet molasses, a source of assimilable nitrogen and a source of cobalt ion with a vitamin $B_{12}$-activity producing strain of *Pseudomonas denitrificans* and recovering vitamin $B_{12}$-active substances therefrom.

9. In the process for producing vitamin $B_{12}$-active substances by deep fermentation the improvement which consists of utilizing as the microorganism a vitamin $B_{12}$-activity producing strain of *Pseudomonas denitrificans*, whereby relatively high yields of vitamin $B_{12}$-active substances, unmixed with antibiotics and similar unwanted materials, are secured in a relatively short fermentation time.

10. In the process for producing vitamin $B_{12}$-active substances by the continuous fermentation technique, the improvement which consists of utilizing as the microorganism a vitamin $B_{12}$-activity producing strain of *Pseudomonas denitrificans*, whereby due to the relatively short batch fermentation time of this microorganism coupled with the relatively high yields of vitamin $B_{12}$-active substances it produces, the total output of vitamin $B_{12}$-active substances is relatively large.

References Cited in the file of this patent

UNITED STATES PATENTS

| 2,595,499 | Wood et al. | May 6, 1952 |
| 2,653,900 | Holland | Sept. 29, 1953 |
| 2,703,302 | Rickes et al. | Mar. 1, 1955 |

OTHER REFERENCES

Bergey's "Manual of Determinative Bacteriology," 6th ed., Williams and Wilkins Co., 1948, pp. 65 to 67, 82 to 84 and 98.

Leviton et al.: "Ind. & Eng. Chem.," vol. 44, No. 11, November 1952, pp. 2651–2655.